No. 647,817. Patented Apr. 17, 1900.
P. DUMONT.
ACETYLENE GAS APPARATUS.
(Application filed Oct. 5, 1899.)
(No Model.)
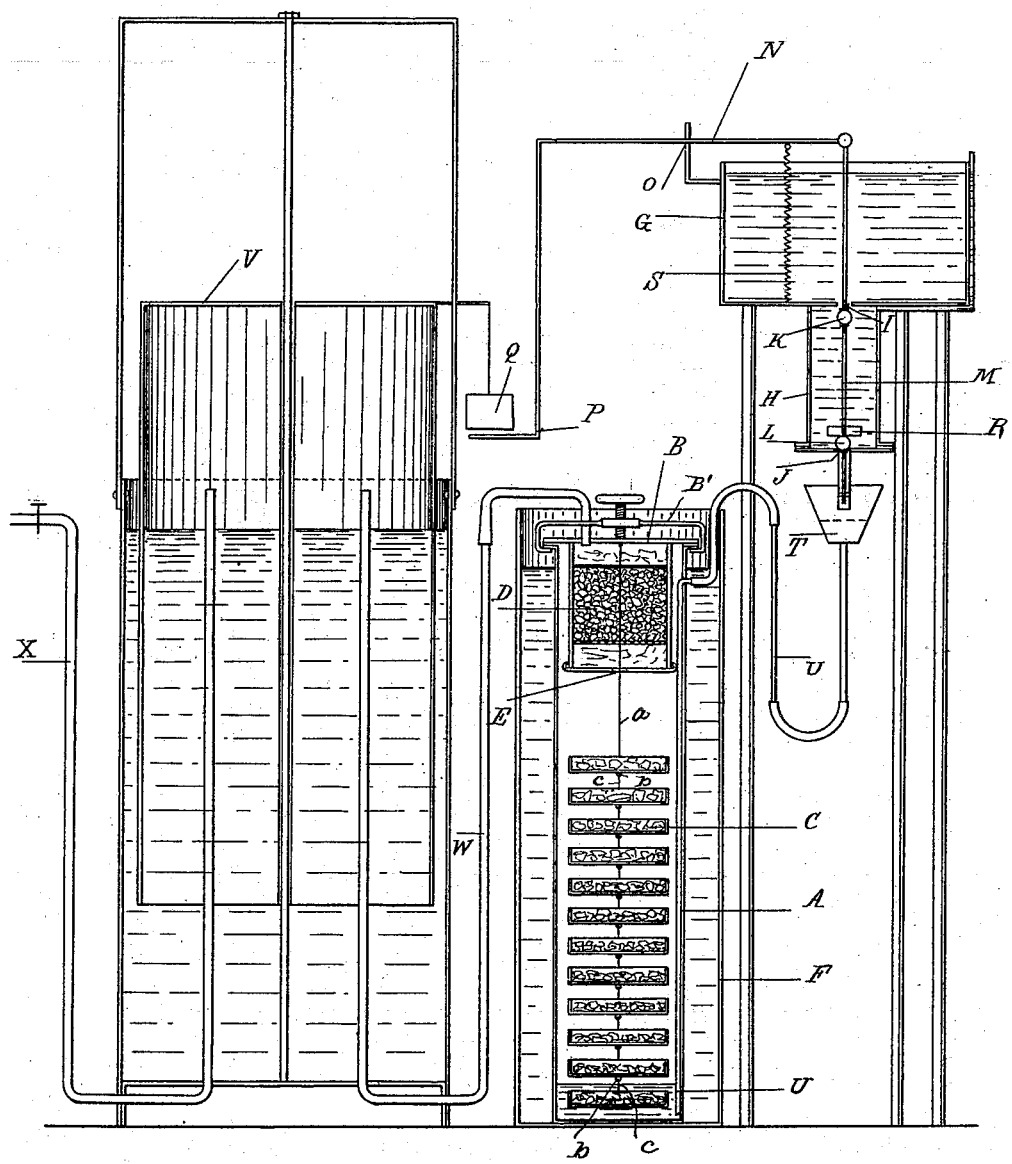
Witnesses:-
Jas. A. Richmond.
Jas. C. Hopkins.
Inventor
Pierre Dumont
by G. Dittmar
his Attorney

UNITED STATES PATENT OFFICE.

PIERRE DUMONT, OF SION, SWITZERLAND.

ACETYLENE-GAS APPARATUS.

SPECIFICATION forming part of Letters Patent No. 647,817, dated April 17, 1900.

Application filed October 5, 1899. Serial No. 732,785. (No model.)

*To all whom it may concern:*

Be it known that I, PIERRE DUMONT, a citizen of the Swiss Republic, residing at Sion, Switzerland, have invented certain new and useful Improvements in Acetylene-Gas Generators; and I do hereby declare the following to be a full, clear, and exact description of the invention, such as will enable others skilled in the art to which it appertains to make and use the same.

The present invention relates to apparatus for generating acetylene gas in which the reaction of water on carbid of calcium is performed in a tightly-closed vessel in which are arranged several baskets overhanging one another at the center of said vessel and each basket containing a determinate quantity of carbid to produce a quantity of gas corresponding to the capacity of the gas-holder. An automatic water-distributing device with spherical valves is operated by a lever, which is itself actuated by a weight attached to the bell of the gas-holder, the said device having for its object to supply the generator with a determinate quantity of water to submerge first the basket which is located nearest the bottom of the generator and then the second and third baskets, successively, when the carbid contained in each of them has been exhausted, said baskets being each adapted to produce a quantity of gas corresponding to the capacity of the gas-holder. While the decomposition of the carbid is progressing in each basket the water-level in the generator is ascending to act on the next-following basket, and then when the whole carbid is exhausted the baskets are again charged and the generator is drained off. Directly the gas is produced it passes through a carbid drying and purifying device, whence it passes to the gas-holder, as usual.

Referring now to the annexed drawing, which illustrates the preferred form of apparatus in vertical section, A is the generator, having a stationary bottom and a closure, such as B, at the top, retained by clamping device B'. Within said generator are depending from each other a certain number of carbid-baskets C (generally twelve in number) of wide and shallow form and opened at top only, the first being secured by means of a rod $a$ to the cover B and the others being suspended from one another by means of links or eyes $b$ and hooks $c$. From said cover is also suspended a drying-chamber D, containing a packing of cotton and carbid, through which the gas passes as soon as it is produced. The bottom of this chamber or vessel may be closed as desired by means of the well-known bayonet connection, and the gas may enter at apertures E.

The generator is supported in a vat E, opened at its upper end and filled with water, and this for the purpose of avoiding rising of the temperature.

The automatic water-distributing device comprises a tank G, to contain sufficient water to decompose all the carbid contained in the twelve baskets of the generator, and a tank H, fixed to the lower part of the tank G, the capacity of which corresponds to the volume of water required to submerge wholly, one after the other, all the twelve carbid-baskets of the generator, said volume of water corresponding to five times the quantity required for the complete decomposition of the carbid in each basket.

The bottom of each tank G H is provided at its center with circular apertures I and J, respectively, which may be closed alternatively by means of two india-rubber balls K L, fixed between two nuts in a determinate position on the rod M. Said rod is attached at its upper end to the end of a lever N, fulcrumed at O, and said lever has a downwardly-bent arm P, adapted to be tripped by the weight Q, attached to a chain which is secured to the bell of the gas-holder. A balance-weight R and a spring S are provided to force the india-rubber sphere L back upon its seat when the gas-holder contains sufficient gas and when the weight Q is no longer in contact with the lever N P on account of being raised with the bell.

The water which flows off from the tank H at the moment the aperture J is opened falls into funnel T and passes through a bent trap U into the lower part of the generator.

As soon as the acetylene gas produced has passed through the drying vessel D it flows into the gas-holder V through pipe W and from there is led to the main by a pipe N.

This apparatus presents the advantage of providing for a regular and automatic supply of water of sufficient volume to effect instantaneously the entire decomposition of the carbid contained in each basket, thus avoiding an overproduction.

The quantity of water supplied for each operation is slightly in excess of that required in order to prevent any rise of temperature, and consequently all danger of explosion. The ordinary commercial carbid is preferably used without subjecting the same to previous treatment.

Having thus described my invention, I claim—

The combination with a generator constructed as described, of a gas-holder having a bell and a weight depending from the top thereof, the superposed tanks G and H, the latter of limited capacity, as described, each of said tanks having its bottom centrally apertured; of the rod M having ball-valves K and L for independently opening and closing the respective apertures, a funnel T below tank H, a connection therefrom to the generator, and an angular spring-pressed lever N attached to said valve-rod and having an arm adapted to be tripped by the weight depending from said gas-holder, substantially as described.

In testimony whereof I affix my signature in presence of two witnesses.

PIERRE DUMONT.

Witnesses:
  LOUIS TRÜB,
  JOSEPH VINCENT.